US007743882B2

(12) United States Patent
Vu (10) Patent No.: US 7,743,882 B2
(45) Date of Patent: Jun. 29, 2010

(54) VIBRATION-CONTROL PLATFORM

(76) Inventor: Vinh Thanh Vu, 7 Saddle Ridge Dr., Colts Neck, NJ (US) 07722

( * ) Notice: Subject to any disclaimer, the term of this patent is extended or adjusted under 35 U.S.C. 154(b) by 950 days.

(21) Appl. No.: 10/642,868

(22) Filed: Aug. 18, 2003

(65) Prior Publication Data
US 2005/0039976 A1 Feb. 24, 2005

(51) Int. Cl.
*F16F 15/04* (2006.01)
*F16F 15/00* (2006.01)
*F16F 7/00* (2006.01)

(52) U.S. Cl. .................. 181/209; 181/207; 248/346.04

(58) Field of Classification Search ............... 181/209, 181/207; 248/678, 346.01, 346.04
See application file for complete search history.

(56) References Cited

U.S. PATENT DOCUMENTS

| | | | | | |
|---|---|---|---|---|---|
| 3,679,159 | A | * | 7/1972 | Bach et al. | 248/562 |
| 3,727,870 | A | * | 4/1973 | Bass | 248/618 |
| 3,784,146 | A | * | 1/1974 | Matthews | 248/562 |
| 3,814,357 | A | * | 6/1974 | Rontgen | 248/573 |
| 4,078,751 | A | * | 3/1978 | Stolzlechner | 248/634 |
| 4,560,136 | A | * | 12/1985 | Basore | 248/559 |
| 4,771,858 | A | * | 9/1988 | Goodloe | 181/114 |
| 4,796,849 | A | * | 1/1989 | Fouassier | 248/619 |
| 4,879,857 | A | * | 11/1989 | Peterson et al. | 52/403.1 |
| 4,880,077 | A | * | 11/1989 | Verse et al. | 181/207 |
| 5,056,280 | A | * | 10/1991 | Shustov | 52/167.5 |
| 5,197,707 | A | * | 3/1993 | Kohan | 248/638 |
| 5,290,973 | A | * | 3/1994 | Kwoh | 181/199 |
| 5,330,165 | A | * | 7/1994 | van Goubergen | 267/141 |
| 5,353,559 | A | * | 10/1994 | Murota et al. | 52/167.1 |
| 5,599,106 | A | * | 2/1997 | Kemeny | 384/36 |
| 5,804,776 | A | * | 9/1998 | Bizlewicz | 181/207 |
| 5,905,804 | A | * | 5/1999 | Lee | 381/386 |
| 6,052,955 | A | * | 4/2000 | Haider | 52/167.5 |
| 6,230,460 | B1 | * | 5/2001 | Huyett | 52/403.1 |
| 6,357,717 | B1 | * | 3/2002 | Kennard, IV | 248/638 |
| 6,648,295 | B2 | * | 11/2003 | Herren et al. | 248/636 |
| 6,830,125 | B1 | * | 12/2004 | Bizlewicz | 181/207 |
| 6,895,870 | B1 | * | 5/2005 | Bizlewicz | 108/91 |
| 2003/0218957 | A1 | * | 11/2003 | Tanishima | 369/75.1 |
| 2003/0222194 | A1 | * | 12/2003 | Platus | 248/619 |
| 2004/0105655 | A1 | * | 6/2004 | Ciulla | 386/46 |

FOREIGN PATENT DOCUMENTS

| | | | | |
|---|---|---|---|---|
| GB | 2088996 | A | * | 6/1982 |
| GB | 2089465 | A | * | 6/1982 |
| GB | 2307024 | A | * | 5/1997 |
| JP | 55060739 | A | * | 5/1980 |
| JP | 61013491 | A | * | 1/1986 |

(Continued)

*Primary Examiner*—Edgardo San Martin
(74) *Attorney, Agent, or Firm*—DeMont & Breyer, LLC (57) ABSTRACT

A vibration-control platform that, in some embodiments, includes a bottom plate having three or more wells. The wells receive a plurality of vibration-control elements, which are used to isolate a supported object from vibrations. In some embodiments, the vibration-control elements are rubber balls. The presence of the wells facilitates placement of the vibration-control elements under a top platform or directly under an object, especially when the object is located in a tight space, such as in a component rack, or when the object has a non-uniform weight distribution.

27 Claims, 4 Drawing Sheets

FOREIGN PATENT DOCUMENTS

| | | | |
|---|---|---|---|
| JP | 63140136 A | * | 6/1988 |
| JP | 63199938 A | * | 8/1988 |
| JP | 63210434 A | * | 9/1988 |
| JP | 02017240 A | * | 1/1990 |
| JP | 03134341 A | * | 6/1991 |

* cited by examiner

VIBRATION-CONTROL PLATFORM

FIELD OF THE INVENTION

The present invention relates generally to an article and method for reducing resonances and vibrations that are transmitted to a supported object.

BACKGROUND OF THE INVENTION

Each musical instrument has its own unique resonance signature. This signature is what makes one type of instrument sound different from another and why two specimens of the same type of instrument do not sound the same. In a piece of music, it is the interplay of these unique resonance signatures that is crucial to conveying the musical idea of a composer, arranger, or performer.

It is a goal of an audio playback system, in particular a "high-end" audio system, to faithfully reproduce this interplay, as recorded on a recording medium (e.g., lp, cd, tape, etc.). To do so, the audio system must extract the recorded musical signal without altering it and convert it to sound.

Challenging an audio system's ability to faithfully reproduce the recorded musical signal—and hence re-create the original musical event—is the system's susceptibility to mechanical resonances and vibrations. To the extent that an audio system has its own resonant signature, as imparted by such vibrations, it functions as an instrument. Such an audio system will color every instrument that it tries to reproduce, taking the listener further from a faithful re-creation of the original musical event.

A typical "high-end" audio system will include one or more source components (e.g., cd-player, turntable, etc.), a preamplifier, an amplifier and speakers. The spectral signature of these components is affected both directly and indirectly by mechanical resonances and vibrations. As to direct effects, these components are subjected to vibrations and resonances due to:

Mechanical coupling. The most significant source of mechanically-coupled vibration is the music itself. High-amplitude, low-frequency sound from the speakers mechanically couples through the floor of the listening room, up through the equipment rack into the bottom of a component. Furthermore, very-low-level, low-frequency vibrations from passing vehicles, machinery and other sources can couple through the floor into audio components.

Acoustic pressure. Air-borne energy generated by the loudspeaker/room interface can directly couple to equipment racks, equipment enclosures, and then to signal-generating components.

Internal vibrations. Vibrations arise from sub-systems within the audio components themselves, such as mechanical drive systems (e.g., in cd players and turntables, etc.), spinning cooling fans (e.g., in amplifiers), and humming transformers. Even electric current moving through wires or other components can be a source of vibration. Specifically, current-induced magnetic fields that form around transformers, wires, and other passive devices can cause these components to vibrate or move slightly within their own fields. This creates minute non-linear currents that can subtly alter the original musical signal.

As to indirect effects, vibrations, varying in magnitude from very large (e.g., cabinet resonances that can be felt) to miniscule, can negatively affect playback through time- and frequency-domain disturbances.

To ameliorate the problems wrought by vibrations and resonances, various resonance- and vibration-control products have been developed. The products can be grouped generally into two classes: (1) footers and (2) platforms. Reducing vibrations and resonances through the use of these products has, in some cases, resulted in improvements in imaging, tonal balance, timing, treble focus, bass extension and detail.

Footers, as the name implies, are devices that are placed underneath an audio component and that replace the manufacturer-supplied "feet" that are supplied with the component (and which typically function simply as a standoff to prevent contact and damage to an underlying support shelf). A variety of footer designs have been developed, two of which are mentioned below.

In some cases, the footers are formed of a resilient material (e.g., Navcom™ Sorbothane™, etc.) that is intended to damp vibrations before they reach the supported component. In some other cases, the footers are rigid (e.g., cones, spikes, etc.). Although some rigid footers are alleged by their manufacturers to "drain" energy from the supported component, most function by merely shifting the frequency and level of the resonances.

While effective to varying degrees, footers have their drawbacks. In particular, they can be difficult to place under audio components, especially if the components are enclosed in a cabinet. Furthermore, footer-supported components can be somewhat unstable. Resonance/vibration-control platforms address both of these problems.

Resonance/vibration-control platforms include (1) a base or platform on which the isolated component rests and (2) some type of mechanism for providing resonance/vibration-control for the platform. Several resonance/vibration-control platforms in the prior art are surveyed below.

One type of system includes one or more air-filled bladders that are located beneath a plinth (typically formed from medium density fiberboard). As the bladders are inflated, the plinth—and hence the component—"float," thereby isolating the component from mechanically-coupled vibrations. In a second type of system, a plinth is placed on a substantial volume of sand. The sand conforms to the entire surface of the plinth and efficiently constrains and partially damps the platform's vibrational modes.

In a third type of system, several thermally-reactive copolymers are used as the primary damping material. The copolymers are contained in several modules underneath a plinth. Each different copolymer is intended to control resonances within a certain frequency range. The copolymers possess an ability to rapidly change darometer (i.e., relative hardness or softness). Movement or vibration creates friction in the module, which produces heat. The heat changes the darometer of compound in a pre-calculated manner based on the weight of the component it supports. As vibrations pass through the various modules, their amplitude decreases until they are substantially dissipated.

In a fourth type of system, magnetic levitation is used to isolate a supported component. In this system, coupled magnets that are oriented for repulsion are disposed underneath a plinth.

These various systems have drawbacks. For example, the technology and materials used in some of these systems are expensive, pushing the retail cost of some of these systems upwards of $1000. In some air-based systems, the air leaks out over time, requiring a user to occasionally re-balance the system by adding more air. For some systems, the customer provides information about the weight, weight distribution, and size of a component of interest and then the resonance/ vibration-control system is designed based on these parameters. This limits the suitability of the platform for other equipment should the purchaser decide to replace the component for which the platform was designed. Some systems, such as magnetic levitation platforms, are particularly sensitive to uneven loads. In this regard, footers have an advantage since they can be appropriately positioned under a component to address an uneven weight distribution.

Many of the current resonance/vibration-platforms offer little flexibility to adapt to changes in the playback system. And no one resonance/vibration-control system is best for all components (e.g., one manufacturer's turntable vs. another's, etc.) in all situations (e.g., room construction, etc.). This is problematic because many audiophiles change their playback systems on a regular basis (at least compared to the music-listening public at large). Consequently, an "upgrade" in a source component might downgrade a playback system's ability to reproduce a recorded musical signal because a previous choice in a vibration-control platform is not suited to the new source component. This "upgrade" then occasions another purchase—a new vibration/resonance-control platform that is hopefully better suited to the new source component.

Consequently, there is a need for an improved resonance/vibration-control system.

SUMMARY OF THE INVENTION

The illustrative embodiment of the present invention is a resonance/vibration-control platform that avoids at least some of drawbacks of the prior art.

In some embodiments, the resonance/vibration-control platform includes a bottom plate having three or more wells, and more typically about 8 to 25 wells. The wells are physically adapted to receive a plurality of vibration-control elements, which are used to isolate a supported object from vibrations.

The vibration-control platform is structured so that the vibration-control elements can be readily removed from the wells and replaced with different vibration-control elements. For example, in some embodiments, the vibration-control elements are resilient balls. The balls can be easily placed in the wells or removed from them. Consequently, a user can readily change the vibration-isolating characteristics of the platform. This provides the ability, for example, to adapt to a changing audio system, etc.

Furthermore, the presence of the wells simplifies placement of the vibration-control elements. In particular, it can be difficult to place footer-type vibration-control elements under an object, especially when the object is to be located in a cramped location, such as in an audio equipment rack. Also, to the extent that the vibration-control elements have a tendency to move after placement, the wells restrict such movement.

Unexpectedly, the use of rubber balls, in particular, racquet balls or paddle balls, has been found to be particularly effective in reducing the negative effects of vibrations on audio components, as judged by the improved sound quality of playback systems when using the balls.

The present invention includes other features and provides other benefits, many of which are described in the Detailed Description and illustrated in the appended Drawings.

DETAILED DESCRIPTION

The illustrative embodiment of the present invention is a vibration/resonance-control platform, which is referred to hereinafter as simply a "vibration-control platform." The vibration-control platform can be used to reduce or otherwise control vibrations and resonances in objects that are disposed on it. In some embodiments, the vibration-control platform is used to control vibrations and resonance in audio or video components. These components include digital and analog source components (e.g., cd-players, dvd-audio players, sacd players, turntables, dvd-video players, etc.), amplifiers, preamplifiers, and any other components in the audio or video reproduction chain.

Figure 1A:
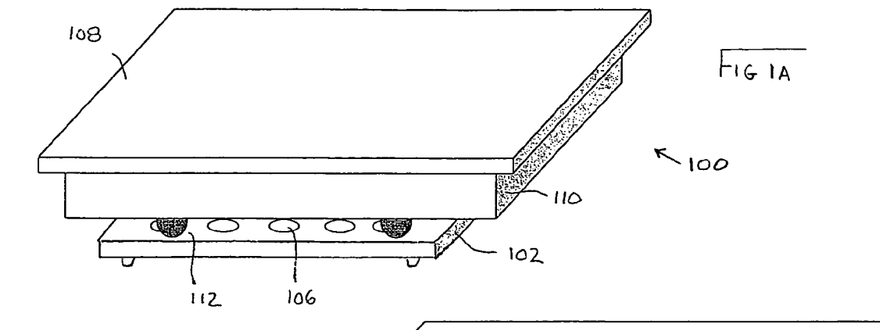
FIG. 1A depicts a vibration-control platform in accordance with the illustrative embodiment of the present invention.

FIG. 1A depicts a perspective view of vibration-control platform 100 in accordance with an illustrative embodiment of the present invention. In the embodiment depicted in FIG. 1A, vibration-control platform 100 includes bottom plate 102, top plate 108, skirt 110 and vibration-control elements 112.

Figure 1B:
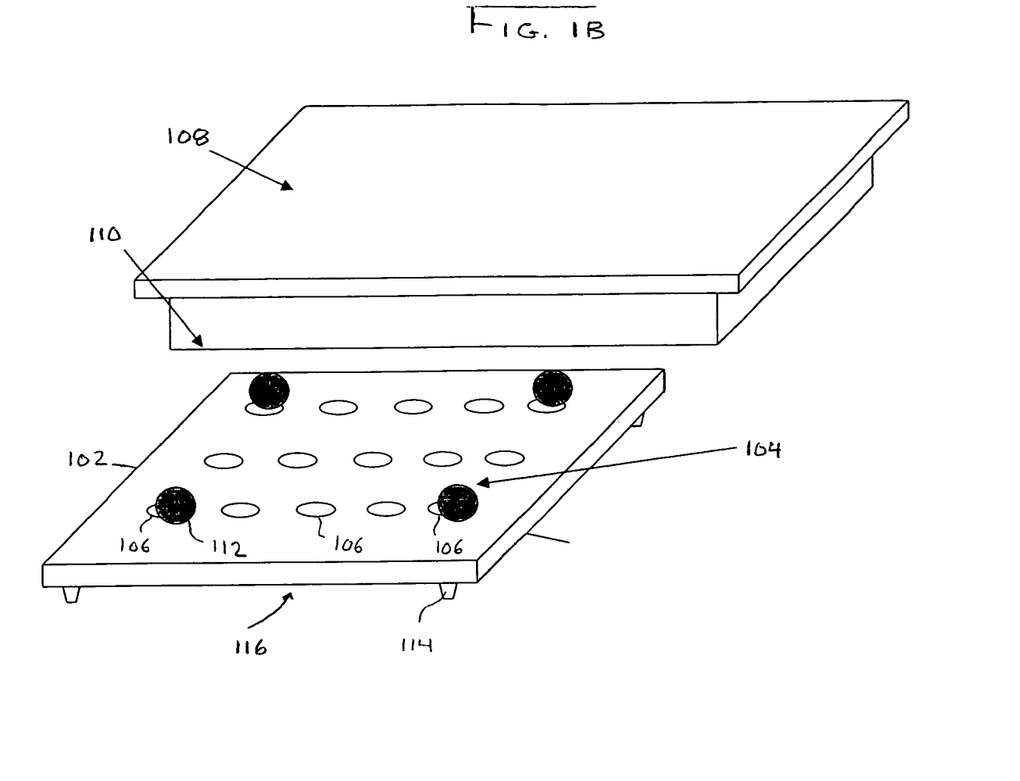
FIG. 1B depicts an exploded view of the vibration-control platform of FIG. 1A.

FIG. 1B depicts an "exploded" view of vibration-control platform 100. As depicted in FIG. 1B, fifteen wells 106, arranged in three rows of five, are disposed on "upper" major surface 204 of bottom plate 102. Wells 106 receive vibration-control elements 112. In the illustrative embodiment, four vibration-control elements 112 are disposed in four of the wells, one element at each corner of bottom plate 102. The bottom surface (not depicted in FIG. 1B) of top plate 108 is supported by vibration-control elements 112. Consequently, top plate 108, and the object (e.g., audio component, video component, etc.) that it supports, experiences a reduction in (at least) mechanically-coupled vibrations.

In some embodiments, rather than placing vibration-control elements 112 in wells that are located at the corners of bottom plate 102, other layouts are used. In those other embodiments, vibration-control elements can be different in the number of elements (i.e., three or more than four), the position of the elements, or both. Some of these other arrangements are described later in this specification.

Balls for Use as Vibration-Control Elements 112

Figure 7:
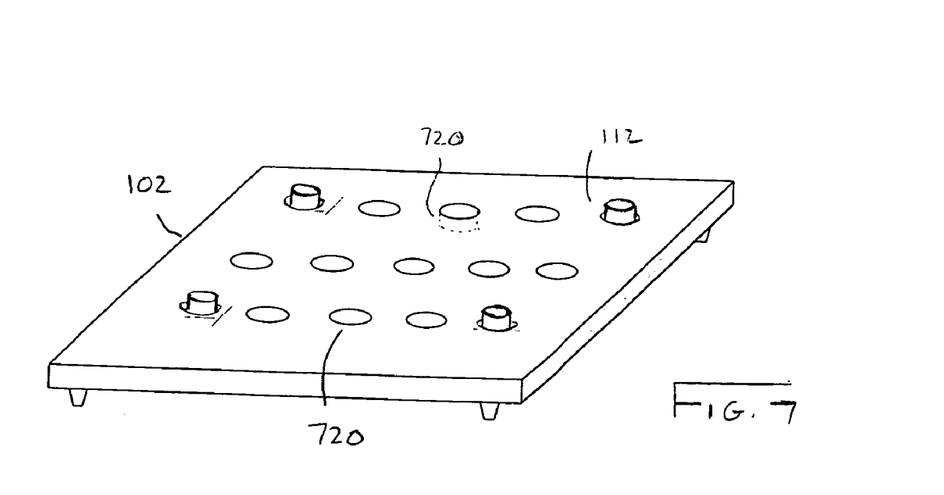
FIG. 7 depicts four vibration-control elements, which are implemented as pucks, disposed on a bottom plate.

In the illustrative embodiment, vibration-control elements 112 are balls. In some other embodiments, vibration-control elements 112 are cones, pucks, or other devices known for localized vibration/resonance control. (See, e.g., FIG. 7 and the accompanying description later in this specification.)

In some embodiments in which vibration-control elements 112 are balls, they are made from a resilient material, such as rubber. Using resilient balls is beneficial because they provide at least three degrees of freedom in the movement of top plate 108 relative to bottom plate 102. In particular, when resting on resilient balls, top plate 108 can move up and down, front to back, side to side, in a circular motion, diagonally, etc. And the resilience of the balls rapidly damps vibrations.

And there are other advantages to using resilient balls as vibration-control elements 112. In particular, they are readily commercially available from a variety of sources (e.g., sporting goods stores, department stores, toy stores, etc.), they are inexpensive compared with most vibration-control products, and they are available with a variety of resiliency characteristics (i.e., from relatively softer, spongier balls to relatively harder, less-yielding balls). Harder balls can be used, for example, when platform 100 will be used to support a relatively heavier component. Alternatively, a larger number of relatively softer balls can be used to support the same, relatively-heavier component. (Although the performance of the platform as to its effect on the reproduced music might differ for these two scenarios.) Furthermore, it is believed that the amount of resilience exhibited by a ball (e.g., due to its material of construction, internal pressure, etc.) will dictate the effect that the ball has on a given (vibrational) frequency and which specific frequencies it will affect.

Resilient balls that have been found useful in conjunction with the present invention, and that are readily available, include racquet balls, paddle balls, hand balls, and squash balls. Also, to the extent that different "grades" of a given type of ball are available (e.g., "regular," "tournament," "long-lasting," etc.), the various grades will typically exhibit different performance characteristics (as a vibration-control element).

Although not resilient, solid metal balls of varying metallurgy (e.g., carbide, etc.) can be used in conjunction with the illustrative embodiment of the present invention. Further, other types of balls, such as golf balls and plastic balls can suitably be used.

It will be recognized that the effect that a particular type of ball has on the performance of an audio or video system will be the net result of a variety of factors. Such factors include, without limitation, the characteristics of the ball, the structure of bottom plate 102 and top plate 108, structural aspects of the component being supported, structural details of the listening room (e.g., concrete flooring, joist-supported flooring, etc.), the design of the equipment stands, etc. It is, therefore, very difficult to predict, a priori, the effect that a particular type of ball will have on the performance of an audio or video system. Consequently, the effect, and the choice of balls, is best determined empirically. And since the balls are typically widely available and inexpensive, such experimentation is easy.

Experimentation notwithstanding, it has been discovered that certain rubber balls, in particular, racquet balls and paddle balls, have been found to be particularly effective as a vibration-control element for audio components.

Wells 106

Wells 106 are physically adapted (i.e., have an appropriate shape and size) to receive vibration-control elements 112. For example, in embodiments in which vibration-control elements 112 are balls, the wells are advantageously (but not necessarily) configured as a "dimple" or "concavity" such that they have a hemispherical (or other similar) shape.

The size of wells 106 is primarily dependent upon the size of vibration-control elements 112. Consider embodiments in which the vibration-control elements are balls. If wells 106 are too large (i.e., deep), the balls will be deeply recessed. As a consequence, the freedom of the balls to move in response to vibrations might be overly constrained. If wells 106 are too small, overlying top plate 108 might be unstable.

A well having a diameter (at the surface of bottom plate 102) in the range of about one-half inch to one and one-quarter inches and a depth of about one-eighth inch to three-eighths inches will be suitable for most balls that are likely to be used as vibration-control elements 112.

In the illustrative embodiment, bottom plate 102 includes fifteen wells 106. In some other embodiments, less than fifteen wells 106 (as few as three) are disposed in bottom plate 102. And in yet additional embodiments, bottom plate 102 comprises more than fifteen wells 106.

One of the benefits of having a relatively large number (e.g., eight or more) of wells 10 in bottom plate 102 is that a relatively greater number of vibration-control elements 112, and non-rectangular arrangements thereof, are readily accommodated. A relatively greater number of vibration-control elements 112 might be required, for example, to support a relatively heavy object. Furthermore, the presence of a relatively large number of wells that are distributed across bottom plate 102 provides an ability to easily position the vibration-control elements as desired. This capability is particularly useful for supporting an object having a very non-uniform weight distribution or unusual shape. (See, e.g., FIGS. 5-6 and the accompanying description later in this specification.)

In embodiments in which rubber balls are used as vibration-control elements 112, the number of wells on bottom plate 102 is typically in the range of 8 to 25 (e.g., 2×4, 3×3, 3×4, 3×5, 3×6, 4×4, 4×5, 4×6, 5×5, etc.) as a function of the size bottom plate 102. More typically, the number of wells on bottom plate 102 is in the range of 12 to 25. All embodiments of the present invention have at least three wells 106.

Bottom Plate 102, Top Plate 108 and Skirt 110

Skirt 110 depends from a marginal region of the lower surface of top plate 108. The skirt increases the rigidity of top plate 108 and also serves to at least partially obscure vibration-control elements 112 from view. The perimeter of skirt 110 is somewhat larger than bottom plate 102, thereby ensuring that any vertical or horizontal movement of top plate 108 does not result in contact between the skirt and bottom plate 102 or vibration-control elements 112. Furthermore, the height of skirt 110 is such that it will not contact the surface (e.g., a table, component rack, etc.) that supports bottom plate 102. The height of skirt 110 will therefore be a function of the thickness of bottom plate 102, the depth of wells 106, the height of vibration-control elements 112, and the desired clearance.

In some embodiments, bottom plate 102, top plate 108, and skirt 110 are formed from acrylic, such as Acrylite™, commercially available from Cryo Industries of Rockaway, N.J. or others. The use of acrylic is advantageous for vibration control because its complex, dense, and irregular molecular structure is believed to hinder propagation of vibrations. In other embodiments, other materials can suitably be used (e.g., any of a variety of woods, glass, other plastics, etc.). The combination of rubber balls as vibration-control elements 112 and an acrylic bottom plate 102, top plate 108, and skirt 110 have been found to be particularly advantageous when the supported object is an audio or video component.

In some embodiments, bottom plate 102 is supported by a plurality (typically, three, four or six) rubber feet 114. The feet prevent damage to the underlying support surface and also provide an additional measure of vibration isolation. In some embodiments, the feet are attached to bottom plate 102 (e.g., bonded, screwed, etc.). In some other embodiments, additional wells (not depicted) can be formed on bottom surface 116 of bottom plate 102. In those embodiments, vibration-control elements 112 are positioned for use as the footers.

Some Variations of the Illustrative Embodiment

Figure 2A:
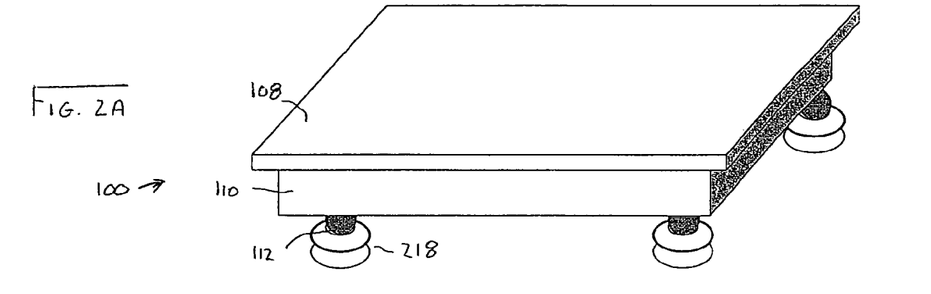
FIG. 2A depicts a first variation of a vibration-control platform in accordance with the illustrative embodiment of the present invention.
Figure 2B:
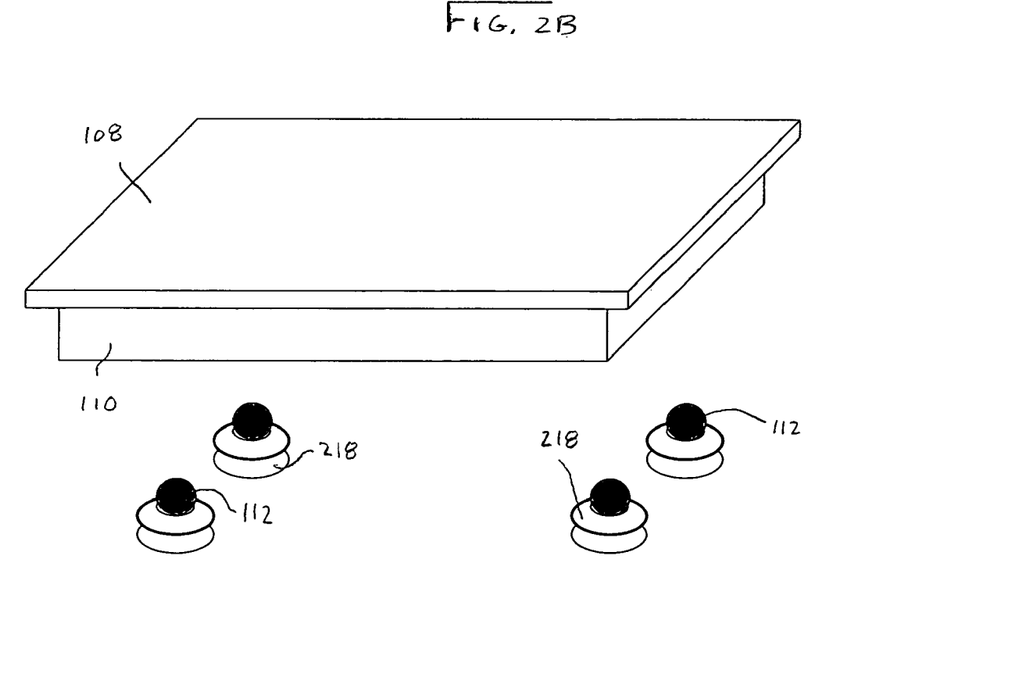
FIG. 2B depicts an exploded view of the vibration-control platform of FIG. 2A.

FIGS. 2A and 2B (exploded view) depict a variation of the illustrative embodiment wherein vibration-control platform 100 includes top plate 108, skirt 110, vibration-control elements 112, and receivers 218 for receiving the vibration-control elements. A bottom plate (i.e., bottom plate 102) is not included. Like wells 106 in bottom plate 102, receivers 218 facilitate placement and control of vibration-control elements 112. In some embodiments, as few as three receivers 218 and three vibration-control elements 112 are used.

Figures 3A, 4:
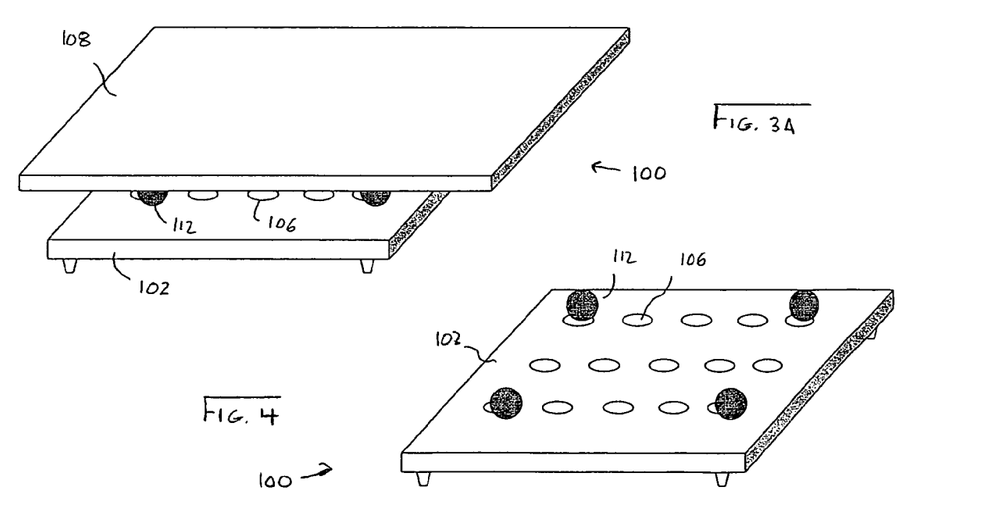
FIG. 3A depicts a second variation of a vibration-control platform in accordance with the illustrative embodiment of the present invention.
FIG. 4 depicts a third variation of a vibration-control platform in accordance with the illustrative embodiment of the present invention.
Figure 3B:
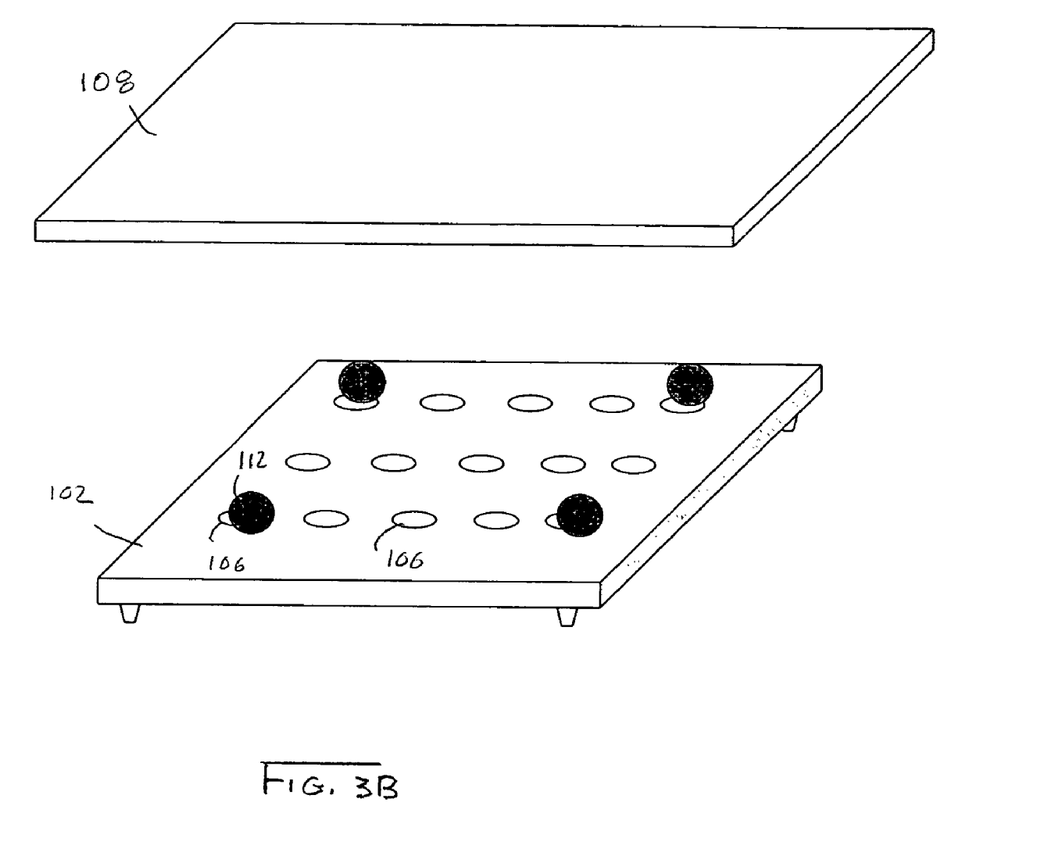
FIG. 3B depicts an exploded view of the vibration-control platform of FIG. 3A.

FIGS. 3A and 3B (exploded view) depict a further variation of the illustrative embodiment wherein vibration-control platform 100 includes bottom plate 102, top plate 108, and vibration-control elements 112. In this variation, top plate 108 does not include skirt 110. This variation is less costly to manufacture than the illustrative embodiment depicted in FIGS. 1A and 1B, but is arguably less aesthetic than the illustrative embodiment since vibration-control elements 112 are readily visible.

FIG. 4 depicts yet a further variation of the illustrative embodiment, wherein vibration-control platform 100 includes bottom plate 102 and vibration-control elements 112, but not top plate. In this variation, the object being supported rests directly on vibration-control elements 112.

As previously described, in some embodiments, more than four vibration-control elements 112 are used in conjunction with vibration-control platform 100 and, further, in some embodiments, the vibration-control elements 112 are positioned in non-rectangular arrangements. Two examples of such embodiments are depicted in FIGS. 5 and 6.

Figure 5:
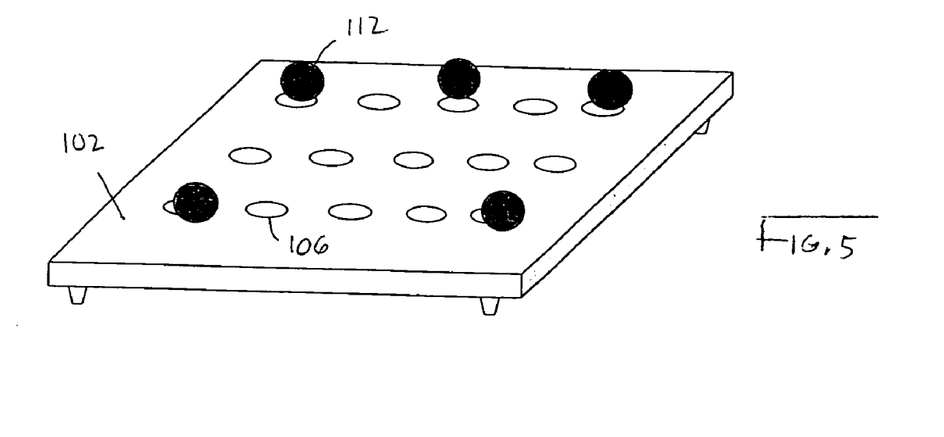
FIG. 5 depicts five vibration-control elements disposed on a bottom plate.
Figure 6:
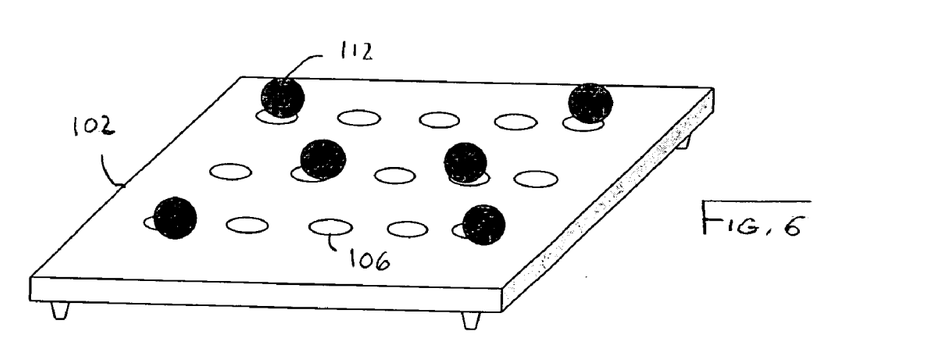
FIG. 6 depicts six vibration-control elements disposed on a bottom plate.

FIG. 5 depicts an embodiment in which five vibration-control elements 112 are disposed in five wells 106 in bottom plate 102. This arrangement might be used to support a component having an uneven weight distribution. A further embodiment depicted in FIG. 6 shows six vibration-control elements 112 disposed in six wells 106. This arrangement might be used to support a relatively heavier component.

It was previously disclosed that in embodiments in which vibration-control elements 112 are not balls, wells 106 might not have a dimpled or hemispherical shape. For example, if vibration-control elements 112 are pucks, as in the embodiment depicted in FIG. 7, then wells 106 are advantageously implemented as a plurality of flat, circular depressions.

EXAMPLE

By way of example, platforms in accordance with the illustrative embodiment have been built with the following dimensions:

| | |
|---|---|
| Top platform 108: | 18 in. (length) × 14 in. (width) × 2½ in. (thickness) [including skirt 110] |
| Bottom platform 102: | 14 in. (l) × 12 in. (w) × ½ in. (thickness) |
| Number of wells 106: | 15 (3 rows of 5 wells each) |
| Size of wells 106: | 1 in. diameter and a maximum of ¼ inch deep |

It is to be understood that the above-described embodiments are merely illustrative of the present invention and that many variations of the above-described embodiments can be devised by those skilled in the art without departing from the scope of the invention. It is therefore intended that such variations, and others that will occur to those skilled in the art in view of the present disclosure, be included within the scope of the following claims and their equivalents.

I claim:

1. An article for use with spherical vibration-control elements, wherein said article comprises:
   a plate having a number, n, of spaced wells arranged in a two-dimensional array, wherein:
   (i) said two-dimensional array comprises at least two rows of said spaced wells with a minimum of three wells in each row;
   (ii) said wells are suitably sized so that when a well receives said spherical vibration control element, said vibration control element contacts said plate at substantially every point along a perimeter of said well;
   (iii) said wells underlie said spherical vibration control elements, and further wherein, in use, the only constraint to unrestricted lateral movement of said spherical vibration control elements are said wells;
   (iv) further comprising said vibration-control elements; and
   (v) wherein there are fewer of said vibration-control elements than said n wells.

2. The article of claim 1 wherein said number, n, is between 8 and 25, inclusive.

3. The article of claim 1 further comprising a top plate, wherein, in use with said vibration-control elements, said top plate is disposed above said plate, proximal to said plurality of wells.

4. The article of claim 3 further comprising a skirt, wherein said skirt depends from a marginal region of said top plate, and further wherein said skirt extends toward said plate.

5. The article of claim 1 wherein said perimeter is circular and has a diameter in the range of between about ½ inch to about ¼ inches.

6. The article of claim 4 wherein said top plate and said plate have the same shape, and further wherein said top plate is larger than said plate such that said plate fits within an area defined by said skirt.

7. The article of claim 1 wherein said plate is acrylic.

8. The article of claim 3 wherein said top plate is acrylic.

9. The article of claim 3 wherein, when said vibration-control elements are disposed in said wells, they do not abut a bottom of said wells.

10. The article of claim 1 wherein said vibration-control elements are balls.

11. The article of claim 10 wherein said balls are resilient.

12. The article of claim 10 wherein said balls are selected from the group consisting of racquet balls, hand balls, paddle balls and squash balls.

13. An article comprising:
   a plate, wherein said plate comprises a first plurality of spaced wells arranged in a two-dimensional array; and
   a second plurality of vibration-control elements, wherein said vibration-control elements are received by some but not all of said wells, one vibration-control element to a well.

14. The article of claim 13 further comprising a top plate, wherein said top plate is disposed above said plate and wherein said vibration-control elements are sandwiched between said plate and said top plate.

15. The article of claim 13 wherein said vibration-control elements are balls.

16. The article of claim 15 wherein said balls are resilient.

17. The article of claim 16 wherein said balls are selected from the group consisting of racquet balls, hand balls, paddle balls and squash balls.

18. The article of claim 13 wherein said plate comprises acrylic and wherein said vibration-control elements are resilient balls.

19. An article comprising:
- a bottom plate, wherein said bottom plate comprises a plurality of spaced wells arranged in a two-dimensional array;
- a plurality of resilient balls, wherein said resilient balls are received by some but not all of said wells; and
- a top plate, wherein said top plate is disposed on said resilient balls, and wherein a surface of said top plate that abuts said resilient balls is planar and does not include wells.

20. The article of claim 19 wherein said bottom plate comprises acrylic and wherein said top plate comprises acrylic.

21. A method comprising:
- providing a bottom plate;
- forming a number, n, of wells in said bottom plate, wherein said wells are arranged in a two-dimensional array, and wherein said two-dimensional array has at least two rows of said wells, and further wherein each said rows comprises at least three wells; and
- providing a number, m, of vibration-control elements, wherein m is less than n.

22. The method of claim 21 further comprising disposing a top plate on said vibration-control elements.

23. The method of claim 21 wherein disposing said plurality of vibration-control elements further comprises selecting a property of said plurality of vibration-control elements as a function of a property of an audio component or video component that is to be supported by said vibration control elements.

24. The method of claim 23 wherein said property of said vibration-control elements is its relative degree of resilience.

25. The method of claim 23 wherein said property of said vibration-control elements is its capacity to support weight.

26. The method of claim 23 wherein said property of said audio component is selected from the group consisting of the weight of said audio component and type of audio component.

27. The method of claim 21 wherein said vibration-control elements are balls.

* * * * *